H. H. KNOTT, E. B. HAMMER AND C. J. JUNGBLUTH.
BUTTON BLANK MAKING MACHINE.
APPLICATION FILED NOV. 20, 1919.
1,403,254.
Patented Jan. 10, 1922.
5 SHEETS—SHEET 4.
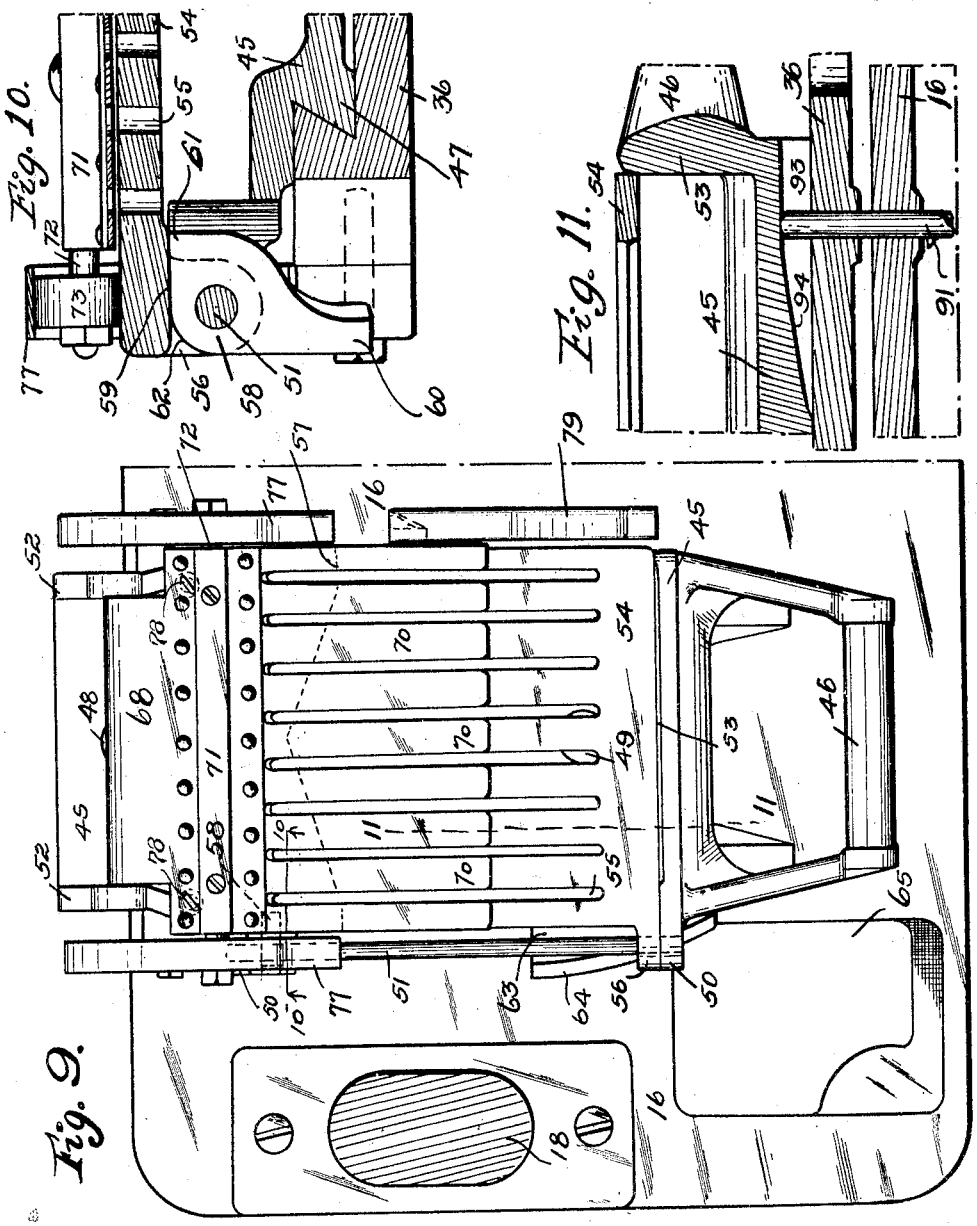
INVENTORS
Harry H. Knott,
Edwin B. Hammer,
Carl J. Jungbluth.
BY Orwig & Bair Att'ys

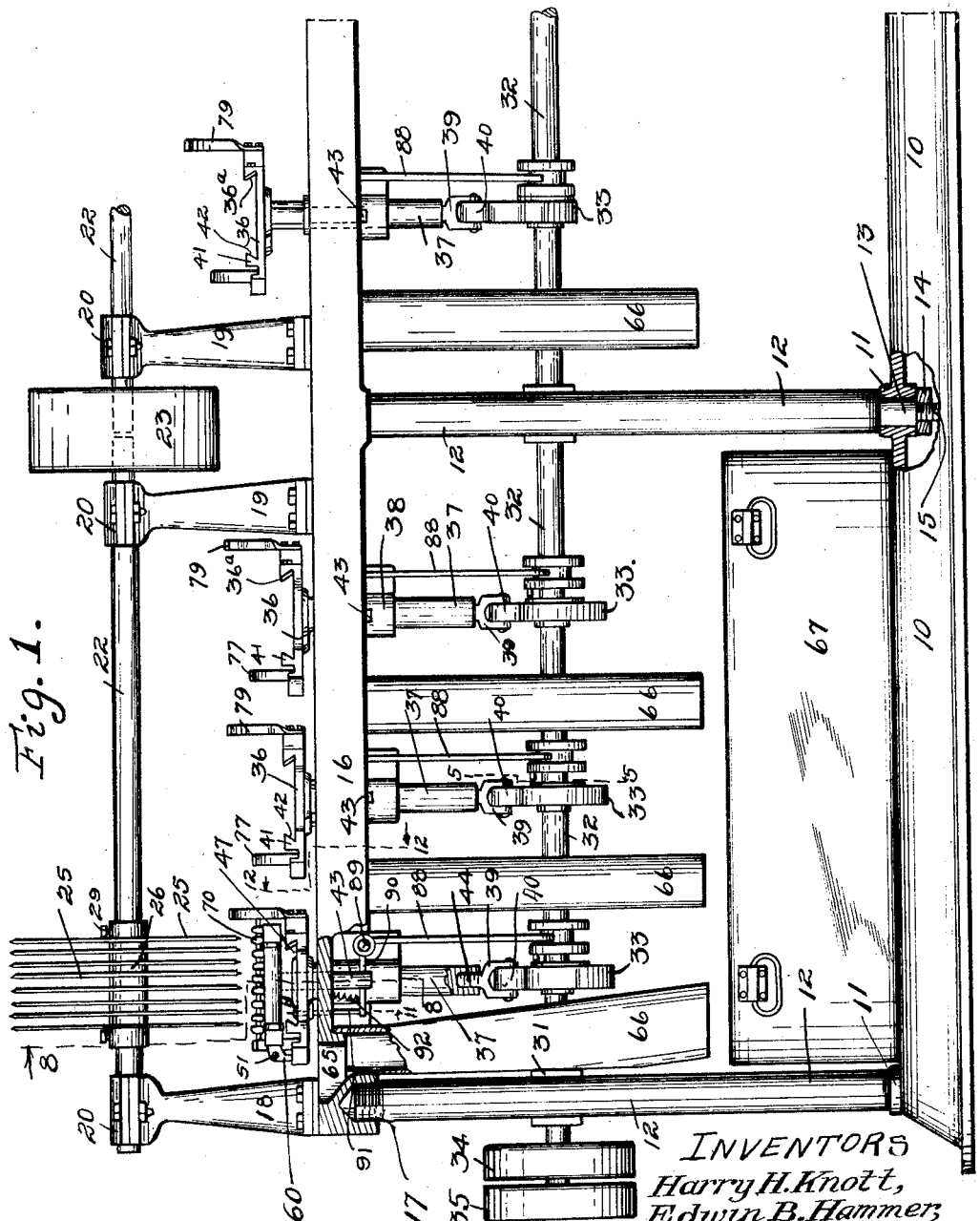

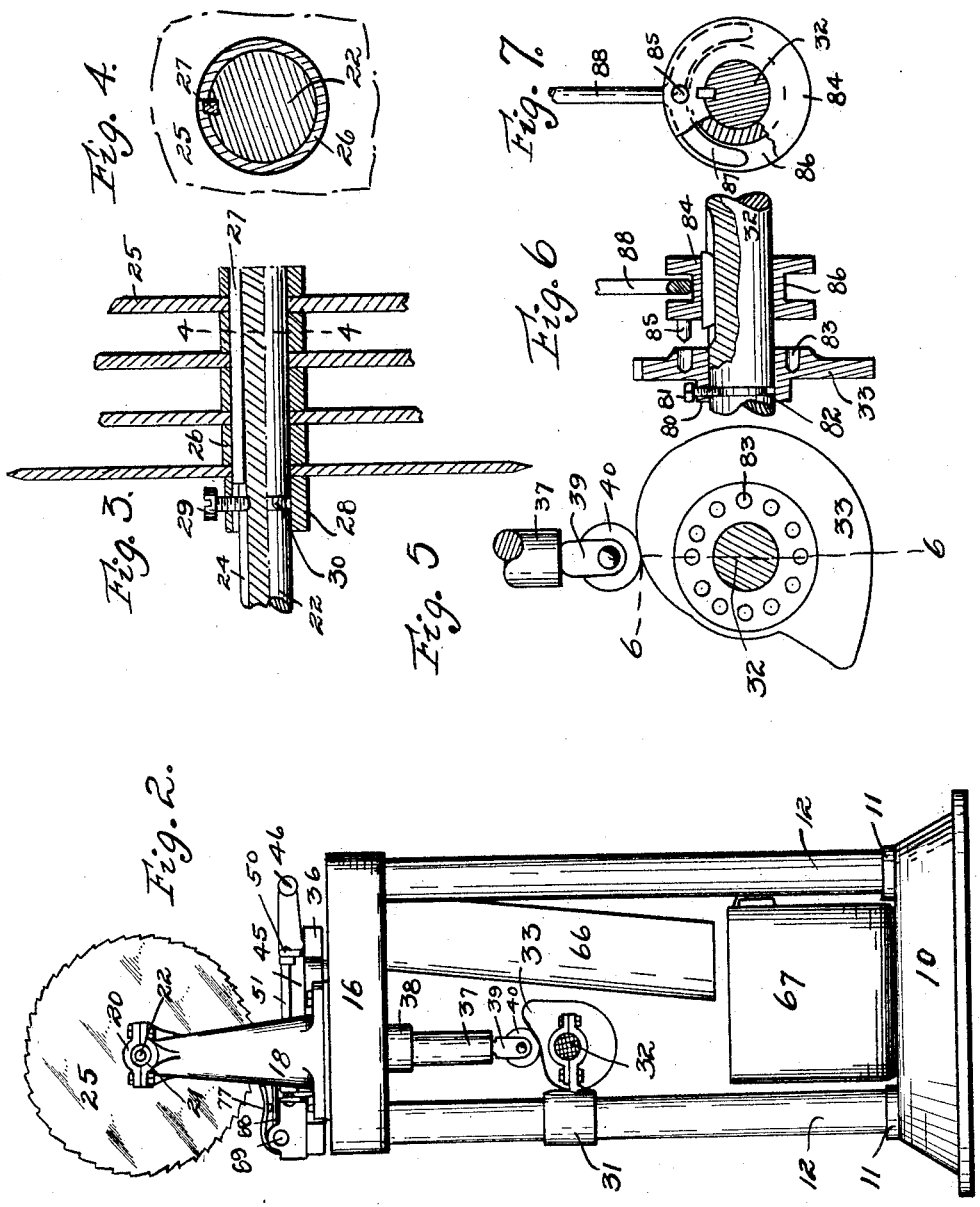

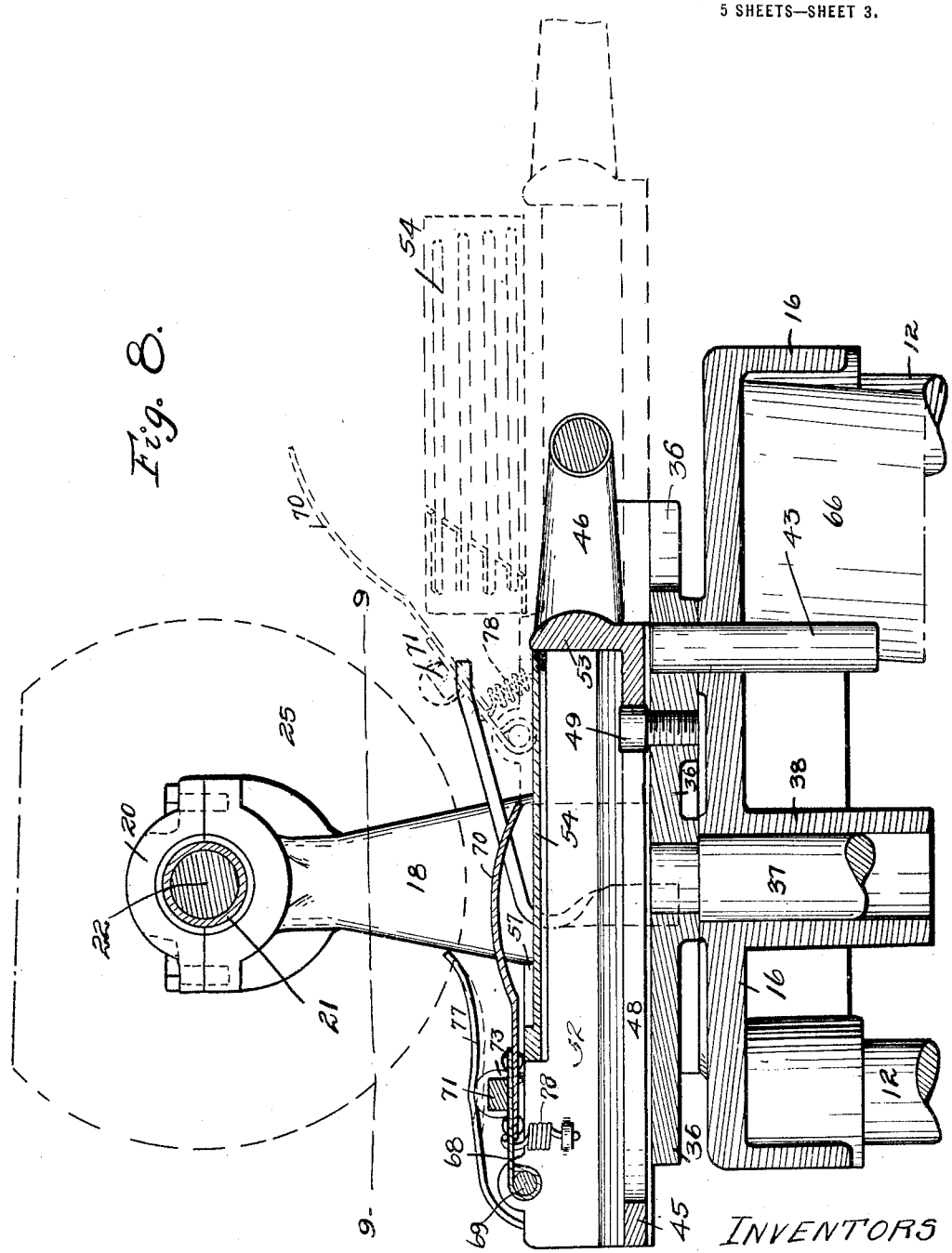

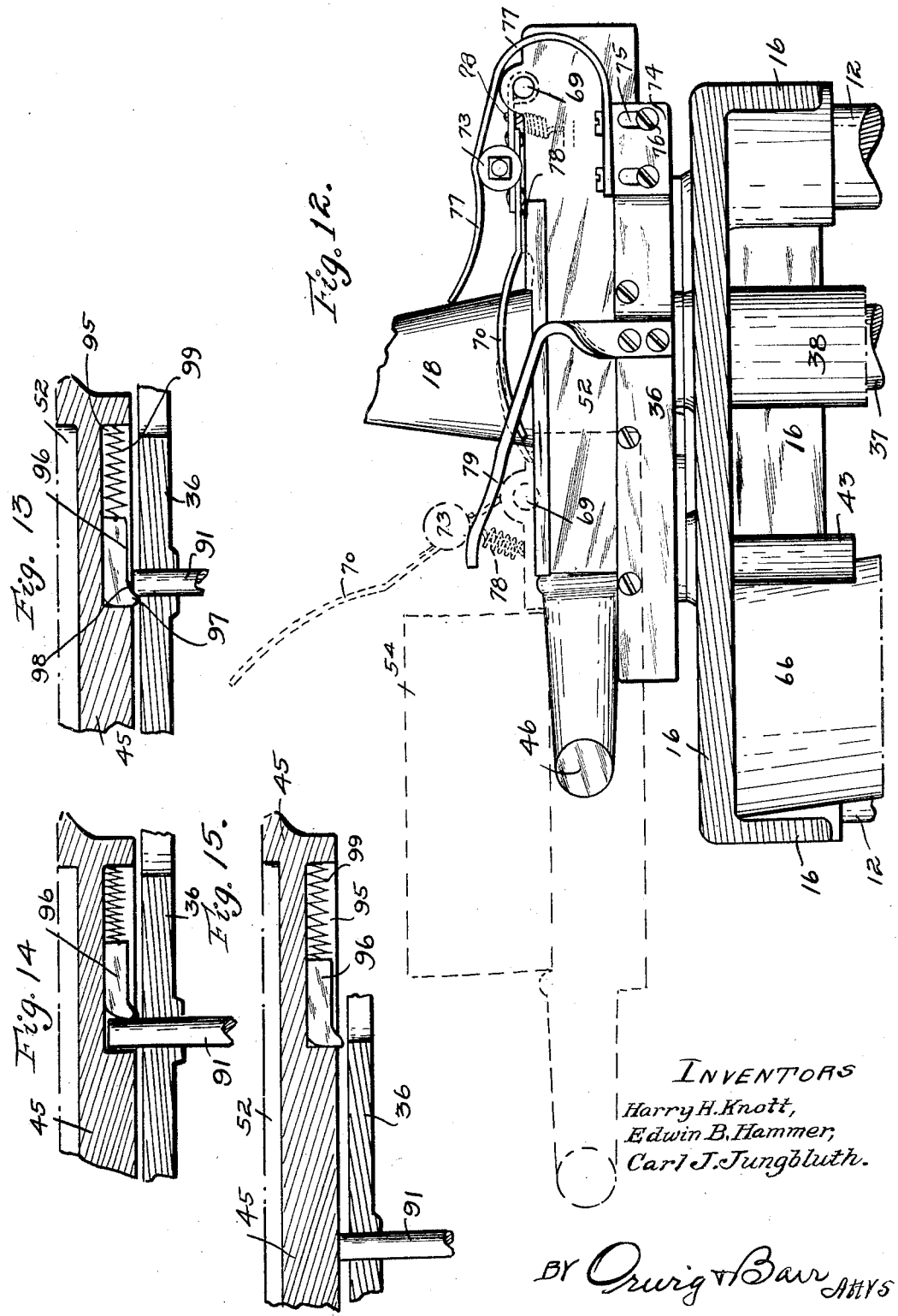

UNITED STATES PATENT OFFICE.

HARRY H. KNOTT, EDWIN B. HAMMER, AND CARL J. JUNGBLUTH, OF WASHINGTON, IOWA, ASSIGNORS TO WASHINGTON MANUFACTURING COMPANY, A CORPORATION OF IOWA.

BUTTON-BLANK-MAKING MACHINE.

1,403,254.   Specification of Letters Patent.   Patented Jan. 10, 1922.

Application filed November 20, 1919. Serial No. 339,452.

*To all whom it may concern:*

Be it known that we, HARRY H. KNOTT, EDWIN B. HAMMER, and CARL J. JUNGBLUTH, citizens of the United States and residents of Washington, in the county of Washington and State of Iowa, have invented a certain new and useful Button-Blank-Making Machine, of which the following is a specification.

The object of our invention is to provide a button blank making machine for sawing shells into blanks for making pearl buttons.

More particularly it is our object to provide such a machine which can be built in batteries or series, with a plurality of sets of saws mounted in each battery or series, so that one operator may operate several of the sets of saws, whereby the shells may be sawed with a maximum speed and a minimum of manual labor.

With these and other objects in view, our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a front elevation of a machine embodying our invention, parts being omitted for the sake of better illustration of other parts, parts being broken away, and parts being shown in section.

Figure 2 shows an end elevation of the machine, the shell carriage operating shaft being illustrated in cross section.

Figure 3 shows a detail view of a portion of the saw shaft, a part of said shaft, the saws and the spacer sleeves being shown in section.

Figure 4 shows a transverse, vertical, sectional view taken on the line 4—4 of Figure 3.

Figure 5 shows a transverse sectional view of the shell holder carriage operating shaft, taken on the line 5—5 of Figure 1, and illustrating one of the cams and the clutch member thereon.

Figure 6 shows a detail sectional view of a portion of said shaft, taken on the line 6—6 of Figure 5.

Figure 7 shows another transverse sectional view of the button carriage operating shaft, illustrating the other clutch member.

Figure 8 shows a transverse, vertical, sectional view, taken on the line 8—8 of Figure 1.

Figure 9 shows a detail sectional view, taken on the line 9—9 of Figure 8.

Figure 10 shows a detail sectional view taken on the line 10—10 of Figure 9.

Figure 11 shows a detail, longitudinal, vertical, sectional view, taken on the line 11—11 of Figure 9.

Figure 12 is a transverse, vertical, sectional view, taken on the line 12—12 of Figure 1.

Figures 13, 14 and 15 are vertical sectional views, taken on a line corresponding to 11—11 of Figures 1 and 9 showing the parts in different positions of their movement.

Our improved shell blank sawing device is preferably built in batteries; that is to say, with several sawing units mounted on one main frame. In the accompanying drawings we have used the reference numeral 10 to indicate generally the base of the main frame of our machine. In the type of machine shown, the base 10 is provided with suitable vertical sockets 11, for receiving the lower ends of supporting posts 12. There is one post 12 at each corner, one in front and one in rear near the middle of the main frame. The posts 12 have reduced portions 13 received in the sockets 11 and terminating in the screw-threaded ends 14, on which are nuts 15 (Fig. 1).

Our machine includes the table 16, having on its under surface suitable sockets 17 which are screw-threaded to receive the screw-threaded upper ends of the posts 12.

Supported on the table 16, near the opposite ends thereof, are upright posts 18, one of which only is shown. Near the middle of the table, from end to end, are two spaced posts 19. The posts 18 and 19 are provided with aligned bearings 20, in which, in bushings 21, are rotatably received the parts of a two-part saw shaft 22. The ends of the parts of the shaft 22 are adjacent to each other midway between the two uprights 19, and slidably but nonrotatably mounted on said ends is a belt pulley 23.

Mounted on the shaft 22 are several groups of saws, which are all alike. Therefore only one group will be described.

The shaft members 22 are provided with a key way 24. Mounted on the shaft 22 and spaced from each other is a series of shell cutting saws 25, which also have slots to receive a key. The saws 25 are spaced apart by spacer sleeves 26, which are locked to the shaft 22 by means of a key 27 received in the key way 24, whereby the saws and spacer sleeves and shaft are locked against relative rotation.

Just outside each endmost saw 25 is a sleeve 28, similar to the sleeves 26, except that the sleeve 28 has mounted in it a set screw 29 extended into a groove 30 in the shaft 22 for locking the saws against sliding movement on the shaft.

In this connection it may be mentioned that it is desirable in many instances to saw shell strips or blanks of different widths, and therefore it is necessary that the saws at times be spaced different distances apart. This is accomplished by using different spacer sleeves 26 and locking sleeves 28.

Rotation is imparted to the shaft members 22 and to the saws thereon through the belt pulley 23, which may be operated from any suitable source of power.

Mounted on the rear posts 12, between the table 16 and the base 10, are forwardly extending bearing brackets 31, which support the cam shaft 32. On the cam shaft 32 is a cam 33 for each set of saws 25 and shell holding table. The shaft 32 is preferably provided at one end with fast and loose pulleys 34 and 35, the functions of which are obvious.

Directly above each cam 33 and above the table 16, is what for convenience we will call the raising table 36, which is supported on a vertical shaft 37 extended through a suitable bearing 38 in the table 16, and carrying at its lower end a yoke 39 in which is mounted a roller 40 which coacts with the cam 33. The raising table 36 has near its sides, guide ribs 41 extending fore and aft in the machine and having their adjacent faces beveled from their upper edges downwardly and away from each other, as illustrated at 42 in Figure 1.

Extending downwardly from the bottom of each raising table 36, and spaced forwardly from the shaft 37 of such table, is a guide rod 43 which is slidably mounted in the table 16 (see Figs. 8 and 1).

It may be mentioned in this connection that the yoke 39 is provided with a shank 44 which screws into the lower end of the shaft 37, so that said yoke may be quickly and easily removed for repairing or replacing its roller 40.

Supported on each raising table 36 is what we may call a sliding table 45, having at its forward end a handle 46. The sliding table 45 has downwardly extending ribs or guide members 47, adapted to coact with the guide ribs 41, for the slidable mounting of the table 45 on the table 36.

Between one of the ribs 47 and the adjacent rib 41 of the table 36 is an ordinary removable dove-tail gib 36ª.

In the table 45 is an elongated slot 48, shown in Figure 8. Mounted in the table 36 is a stop bolt or pin 49, which projects into said slot 48 and limits the fore-and-aft sliding movement of the table 45 with relation to the table 36.

On the left side of the table 45, as illustrated in Figure 9, for instance, are laterally projecting arms 50 forming bearings which receive a shaft 51.

The table 45 has at its sides upwardly extending walls 52, and at its front a similar wall 53, with which the handle 46 is connected. Normally resting upon the upper surfaces of the walls 52 is what we shall call the shell grid plate 54, having a series of spaced elongated slots 55 which register with the respective saws 25 so that when the table 45 is raised the saws 25 may project into the slots 55 and into the space below the grid 54. The grid 54 has at its left side, as illustrated in Figures 9 and 10, downwardly extending ears 56 which form bearings for the shaft 51 and provide means for hingedly mounting the grid 54 on said shaft.

Near the rear end of the grid 54 said grid is formed with a substantially V-shaped shoulder 57, shown in Figure 8, and in dotted lines in Figure 9.

Mounted on the shaft 51 beneath the left-hand side of the grid 54, is a movable trigger device 58 which in its normal position has an upper substantially flat surface 59 which rests against the under surface of the grid 54 and is provided with a downwardly hanging arm 60 adapted to engage a cam hereinafter referred to. The trigger device 58 has a shoulder 61, so arranged that when the arm 60, as shown in Figure 10, is engaged and pushed toward the right, said shoulder will engage the under surface of the grid 54 to the right of the hinge line of said grid, for thereby tilting said grid upwardly and toward the left. The trigger device 58 has the curved surface 62, so arranged that when the arm 60 is pushed toward the left the curved surface 62 will slide under the grid 54 without affecting said grid.

On the table 36 is a laterally extending flange 63, shown, for instance, in Figure 9, having at its outer edge an upwardly extending cam 64 standing in the path of travel of the arm 60 when the table 45 is shoved fore and aft in the machine.

The parts just described are so constructed that when the table 45 is pushed rearwardly toward its position beneath the saws, the arm 60 will engage the cam 64 and be swung to the left, but the grid 54 will be not affected. On the other hand, when the table 45 is pulled forwardly in the machine, the arm 60 will engage the right-hand surface of the cam 64 and be shoved toward the right for causing the shoulder 61 to engage and raise the grid 54, for tilting it upwardly so as to cause anything that may rest upon it to slide toward the left. The grid is shown in its tilted position in Figure 8, in dotted lines.

At the front of the main table 16, and at the left of each of the shell holding table devices, is a suitable opening 65 through which the contents of the grid may be discharged into a chute 66 and from thence to a suitable container 67 (see Figs. 2, 8 and 9).

It will be understood that when a shell is placed on the grid 54 it may be shoved rearwardly until it engages the shoulder 57. For then holding the shell on the grid we have provided the following shell holder finger device:

A strip or plate 68 is hinged, as on a pintle 69, at the rear part of the table 45, and secured to said plate 68 is a plurality of forwardly extending, spaced, shell gripping fingers 70, which are preferably curved upwardly at their central portions, as illustrated in Figure 8. These fingers are spaced apart so that the spaces between them register with and correspond in width to the slots 55, so that when the shell holding tables are raised the saws may readily move between the fingers 70.

On the strip 68 is secured a bar 71 having at its ends spindles 72, on which are mounted rollers 73. Secured to the table 36, near the rear end thereof and at the sides of said table, are plates 74. The plates 74 have elongated slots 75. Screws 76 are mounted in said slots and in the table 36, for adjustably mounting said plates 74 on said table.

Secured to the plate 74 on each side of the table 36 is one arm of a substantially U-shaped spring 77. The upper arms of said springs are longer than the lower arms. The upper arms of said springs 77 are so arranged, as illustrated, for instance, in Figures 8, 9, 10 and 12, that when the sliding table 45 is pushed rearwardly the upper arms of the spring 77 will engage the rollers 73 for pressing the shell engaging fingers 70 snugly downwardly for causing them to frictionally grip a shell which may be on the shell supporting grid 54.

There is also connected with the plate 68 and one wall 52 a coil spring 78, which tends to hold the fingers 70 down, and which assists the springs 77.

Mounted on the side of the table 36 is a raising track or guide or cam 79, shown in Figure 12, which is so shaped and located that when the sliding table 45 is drawn forwardly in the machine, one of the rollers 73 engages said guide or track 79 for causing the shell holding fingers 70 to be tilted upwardly, as illustrated by dotted lines in Figure 12.

We will now describe the mechanism for raising the shell holding means for bringing the shell which rests on the grid 54 into contact with the saws 25.

We have already described the vertical shaft 37 with the roller 40 supported thereby and arranged to coact with the cam 33. Each cam 33 has a short hub 80, in which is mounted a screw 81 which travels in a groove 82 in said shaft 32, whereby the cam is rotatably but non-slidably mounted on the shaft.

Each cam 33 has in one side face, a series of holes 83 arranged in a circle, as illustrated in Figures 5 and 6. Slidably but non-rotatably mounted on the shaft 32 adjacent to each cam 33, is a clutch member 84 having a pin 85 adapted, when the clutch member 84 is slid toward the cam, to enter one of the holes 83 for locking the clutch member 84 and the cam together.

The clutch member 84 has an annular, circumferential groove 86, in which is received a yoke 87 on the lower end of one arm 88 of a bell crank lever which is pivoted at 89, as shown in Figures 1, 6 and 7. The other arm 90 of said bell crank lever extends toward the left beneath the main table 16, as illustrated in Figure 1.

Slidably mounted in the table 16, for vertical reciprocation, is an upright rod or shaft 91, shown in Figures 1, 11, 13, 14 and 15. The rod 91 also extends slidably upwardly through the table 36, as illustrated in Figures 11, 13, 14 and 15. The lower end of the upright rod 91 rests upon the arm 90 of the bell crank lever above described. A coil spring 92, shown, for instance, in Figure 1, connects the arm 90 with the table 16 for normally tending to draw the bell crank lever to such position as to move the clutch members, comprising the member 84 and the cam 33, into operative engagement.

It may be mentioned that the length of the rod 91 is such that it engages the under surface of the table 45 in most of the positions of such table, and is forced downwardly a sufficient distance to hold the clutch members out of engagement.

In the drawings herewith we have shown two forms of device for permitting the clutch to be thrown into engagement by such spring.

In the form of the device shown in Figure 11, there is provided on the under surface of the table 45 a groove 93 having a beveled portion 94, so arranged that when the slidable table 45 is pushed inwardly to what may be called sawing position, the upper end of the rod 91 enters the groove 93, whereupon the spring 92 actuates the bell crank lever for throwing the clutch member 84 toward the cam. If in such movement the pin 85 registers with one of the holes 83, the clutch members will engage. If not, the shaft 32 will continue to rotate until one of the holes 83 does register with the pin 85, whereupon the pin 85 will enter such hole, and thereafter the cam will be actuated for engaging the roller 40 and raising the shell holding mechanism. As soon as the sawing has been finished, the operator pulls the slidable table 45 forwardly, whereupon the pin 91 will travel along the beveled surface 94 for throwing the clutch out of engagement.

In Figures 13, 14 and 15, we have shown the table 45 provided near its forward end on its under surface, with an elongated slot or recess 95, in which is a slidable pawl 96 having a projection 97 which extends downwardly below the lower surface of the table 45 at the rear end of the pawl member. This pawl member has on the forward side of said projection, a beveled edge 98. The pawl 96 is normally held at the rearward position of its movement by means of a spring 99.

In the form of the device shown in Figures 13, 14 and 15, when the table 45 is in any of its forward positions of movement the pin 91 engages the under surface of said table for holding the clutch out of engagement. When, however, the table 45 is pushed rearwardly toward sawing position, the pin 91 engages the projection 97 on the end of the pawl 96 and forces said pawl forwardly in its slot until the pin 91 registers with the rearward end of the slot, whereupon the spring 92 will force the pin upwardly into the slot, and the parts will assume the position shown in Figure 14. After the shell holding table has been raised for the sawing operation, and has cleared the rod 91 and permitted the pawl to slide rearwardly, then when the shell holding table is lowered the parts stand as shown in Figure 13. When the sliding table is pulled forwardly again, the upper end of the pin 91 will slide over the beveled edge 98.

It will thus be seen that with both of the forms of the clutch controlling mechanism, we have provided means whereby the shell holding members are disconnected from the cam shaft except after the slidable table is moved rearwardly to sawing position.

We will now describe more fully the operation of our improved shell sawing machine.

Assuming that the slidable table 45 is at the forward position of its movement, and that the grid 54 is in horizontal position, and the fingers 70 raised, the operator places a shell, open-side down, on the grid, and shoves the shell against the shoulder 57. He then grasps the handle 46 and shoves the sliding table rearwardly in the machine. As the table moves rearwardly, one of the rollers 73 will slide down the guide 79, and both the rollers 73 will then be engaged under the springs 77 for causing the shell holding fingers 70 to frictionally and yieldingly grip the shell. When the table 45 reaches a certain position in its rearward movement, the spring 92 will force the rod 91 upwardly into the slot 93 or 95, as the case may be, whereupon the clutch members will move into engagement, and the rotation of the shaft 32 and the cam thereon will force upwardly the shell holding tables for bringing the shell into contact with the saws. The saws will saw through the shell and pass between the fingers 70 and through the slots 55, thereby cutting the shell into strips which may subsequently be cut into squares or the like, for completing the button blanks.

Where the form of the invention used in Figures 13, 14 and 15 is employed, it will be obvious that when the shell holding tables are moved upwardly, they will entirely clear the rod 91, and the pawl 96 will move from its position shown in Figure 14 to its position shown in Figure 13. When the shell holding tables are lowered, the rod 91 will be lowered and the clutch members thrown out of engagement. When the tables reach their lowermost positions, the operator pulls the sliding table forwardly. As this table moves forwardly, the rollers 73 will move out of engagement with the springs 77, and one of the rollers 73 will travel up the guide 79 for raising the fingers 70 and thereby permitting the free tilting movement of the grid. As the table 45 moves forwardly, the arm 60 engages the cam 64 for tilting the grid 54 and discharging the shell strips from the grid through the opening 65 and the chute 66 into the receptacle 67.

One operator can handle several sets, perhaps six or more, of the saws.

It is well known that in the button business it is necessary to make the blanks of different widths for finally finishing buttons of different diameter. We, therefore, contemplate the use of interchangeable grids and shell gripping finger sets, arranged with the slots 55 of different widths for cutting different blanks, and with the fingers 70 of such size as to correspond with the respective grids. The saws are the same, but the spacing sleeves may be varied to suit the corresponding sets of grids and fingers.

Some changes may be made in the construction and arrangement of the various parts of our machine without departing from the essential purpose and features of our invention, and it is our intention to cover by our claims any modified forms of structure or use of mechanical equivalents that may be reasonably included within their scope.

We claim as our invention:

1. A shell cutting machine comprising a support, a series of operative cutting members, a table adapted to move into position adjacent to said cutting members and away from said position, a slotted grid on said table, and means for holding shells on said grid, said grid being mounted for movement for discharging the finished product.

2. A shell cutting machine comprising a support, a series of operative cutting members, a table adapted to move into position adjacent to said cutting members and away from said position, a slotted grid on said table, means for holding shells on said grid, and means for automatically operating said last means for moving it to and from operative position according to certain movements of said table, said grid being mounted for movement to position for discharging the finished product.

3. A shell cutting machine comprising a support, a series of operative cutting members, a table adapted to move into position adjacent to said cutting members and away from said position, a slotted grid on said table, means for holding shells on said grid, said grid being mounted for movement for discharging said finished product, and means for automatically effecting said discharging movement during certain movements of the table.

4. In a device of the class described, a support, a series of operative cutting members mounted adjacent to said support, a table mounted for vertical reciprocation, a table mounted on said first table for sliding movement, a grid on said second table, means for gripping and holding shells on said second table, means for raising and lowering said first table, and means for moving said last means into operative position when the second table is moved to position adjacent to the cutting members, and for moving said last means out of operative position when the second table is moved away from the cutting members.

5. In a machine of the class described, a support, a series of operative cutting members mounted adjacent to said support, a table mounted for vertical reciprocation on said support, a slidable table mounted on said first table, a grid on said slidable table, means for gripping a shell at a variety of points for holding it on said second table, a rotating shaft, an actuating device thereon, and means for throwing said actuating device into operative relation with said first table for vertically reciprocating it and for throwing said actuating device out of operative relation with said first table.

6. In a machine of the class described, a support, a series of operative cutting members mounted adjacent to said support, a table mounted for vertical reciprocation on said support, a slidable table mounted on said first table, a grid on said slidable table, means for gripping a shell at a plurality of points and holding it on said second table, a rotating shaft, an actuating device thereon, and means for throwing said actuating device into and out of operative relation with said reciprocating table for vertically reciprocating it, said last means being controlled by the movement of said second table.

7. In a device of the class described, a support, a series of operative cutting members mounted adjacent to said support, a table mounted on said support, for vertical reciprocation, a slidable table mounted on said first table, means on said slidable table for holding shells during a cutting operation, a rotating shaft, a cam loosely mounted thereon, a rod on said first table, arranged to be actuated by said cam for raising the first table, a clutch device for operatively connecting said cam with said shaft, and means controllable according to the movement of the second table, for regulating the clutch device.

8. In a device of the class described, a support, a series of operative cutting devices adjacent to said support, a table mounted on said support, for vertical reciprocation, a slidable table mounted on said first table, means on said slidable table for holding shells during a cutting operation, a rotating shaft, a cam rotatably mounted thereon, a rod on said first table, arranged to coact with said cam, said cam having a plurality of openings arranged in a circle, a clutch device slidably but non-rotatably mounted on said shaft, having a pin adapted to enter said openings, and mechanism interposed between the said clutch device and said second table, whereby said clutch device is moved to its various positions according to the sliding position of said second table.

9. In a device of the class described, a support, a series of operative cutting members mounted adjacent to said support, a table mounted on said support for vertical reciprocation, a slidable table mounted on said first table, means on said slidable table for holding shells during a cutting operation, a rotating shaft, a cam rotatably mounted thereon, a rod on said first table, arranged to coact with said cam, said cam having a portion forming a clutch member, a slidable but nonrotatable clutch member on said shaft, adapted to coact with the cam clutch member, means for normally holding said clutch members in coacting position, and means interposed between said last means and said slidable table, whereby said last means may be held inoperative during a considerable portion of the movement of the sliding table.

10. In a shell cutting machine, a support, a plurality of operative cutting members mounted adjacent to said support, a slidable table, means thereon for yieldingly gripping a shell at a plurality of points, and means controllable by the movement of said table for automatically raising said horizontally slidable table for bringing shells thereon in contact with said cutting members when the slidable table is moved to one position of its horizontal movement.

11. In a shell cutting machine, a support, a series of operative cutting members mounted adjacent to said support, a slidable table, means thereon for holding a shell, and means controllable by the movement of said slidable table, for automatically moving said slidable table to position for causing a shell on the table to be cut and for then moving said table away from said cutting members.

12. In a machine of the class described, a support, a series of operative cutting members mounted adjacent to said support, a table mounted for vertical reciprocation on said support, a slidable table mounted on said first table, a grid on said slidable table, means for holding shells on said second table, a rotating shaft, an actuating device thereon, means for throwing said actuating device into and out of operative relation with said reciprocating table, and means interposed between said last means and said slidable table, whereby said last means may be held inoperative during a considerable portion of the movement of the sliding table.

13. In a shell cutting machine, a support, a cutting device, a shell holding table, means for raising said table for bringing it into position for cutting a shell supported on said table, and means for automatically disconnecting said last means from said table after each operation of said machine.

14. In a shell cutting machine, a support, a cutting device, a shell holding table, means for raising said table for bringing it into position for cutting a shell supported on said table, and means for automatically disconnecting said last means from said table after each operation of said machine, said last means including a vertically slidable rod mounted in said table, a slidable member on said table having a groove in its under surface, a spring actuated pawl mounted in said groove, having a portion projecting downwardly from said slidable member, provided with a beveled shoulder and substantially straight shoulder.

Washington, Iowa, October 17th, 1919.

HARRY H. KNOTT.
EDWIN B. HAMMER.
CARL J. JUNGBLUTH.